United States Patent [19]
Raes

[11] Patent Number: 4,729,213
[45] Date of Patent: Mar. 8, 1988

[54] WRAPPING APPARATUS FOR ROUND BALERS

[75] Inventor: Johan L. M. Raes, Zedelgem, Belgium

[73] Assignee: New Holland Inc., New Holland, Pa.

[21] Appl. No.: 927,626

[22] Filed: Nov. 6, 1986

[30] Foreign Application Priority Data

Nov. 12, 1985 [EP] European Pat. Off. ...... 85/201843.1

[51] Int. Cl.⁴ .................. A01D 59/00; A01F 15/14
[52] U.S. Cl. ................................ 56/341; 100/88; 100/15; 226/190
[58] Field of Search ............... 56/341, 343; 242/67.2, 242/76; 226/190, 193; 206/83.5, 442; 100/88, 89, 15, 5

[56] References Cited

U.S. PATENT DOCUMENTS

| | | | |
|---|---|---|---|
| 1,563,704 | 12/1925 | Greis | 226/193 |
| 2,717,037 | 9/1955 | Goodwillie | 242/76 |
| 3,056,164 | 10/1962 | Reichel et al. | 226/193 |
| 3,240,442 | 3/1966 | Kilmartin | 226/193 |
| 4,366,665 | 1/1983 | VanGinhoven et al. | |
| 4,409,784 | 10/1983 | VanGinhoven et al. | |
| 4,566,379 | 1/1986 | Decoene et al. | |
| 4,569,439 | 2/1986 | Freye et al. | |
| 4,580,398 | 4/1986 | Bruer et al. | 100/5 |
| 4,599,844 | 7/1986 | Clostermeyer et al. | |

FOREIGN PATENT DOCUMENTS

| | | | |
|---|---|---|---|
| 3301420 | 7/1984 | Fed. Rep. of Germany | 100/5 |
| 3336554 | 12/1985 | Fed. Rep. of Germany | |
| 2552969 | 9/1984 | France | |
| 2146288 | 4/1985 | United Kingdom | |
| 2152872 | 8/1985 | United Kingdom | 56/341 |

*Primary Examiner*—John Weiss
*Attorney, Agent, or Firm*—Darrell F. Marquette; Frank A. Seemar; Larry W. Miller

[57] ABSTRACT

A round baler comprising a bale chamber in which crop material is formed into a bale, crop material pick-up means operable to deliver crop material to the bale chamber, apparatus for wrapping a formed bale with sheet material comprising feed rolls operable to feed the sheet material so that it can engage the formed bale and be wrapped therearound, and a knife operable to sever the sheet material when the formed bale has been wrapped with a predetermined length thereof. A further roll is disposed between the feed rolls and the formed bale for applying the sheet material in its full nominal width to the formed bale.

9 Claims, 4 Drawing Figures

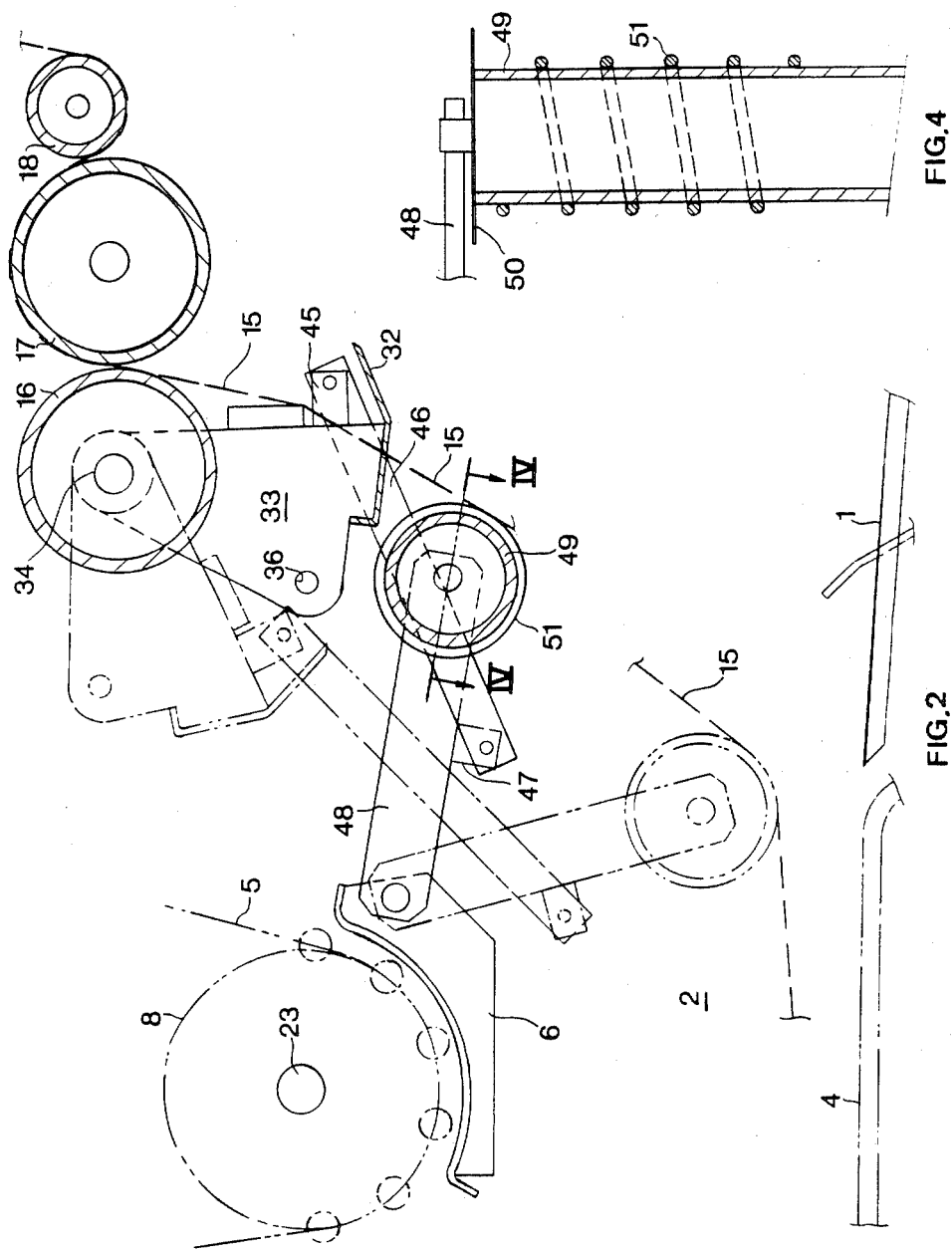

WRAPPING APPARATUS FOR ROUND BALERS

BACKGROUND OF THE INVENTION

This invention relates to agricultural baling machines and more especially to such machines known as round balers which produce cylindrical bales of crop material.

When round balers were first introduced, a completed bale was wrapped with twine in order to retain its shape during subsequent handling, just as the previous rectangular bales were tied with twine. However, in order to achieve satisfactory wrapping of a round bale, the twine has to be reciprocated back and forth along the length of the formed bale as the latter is rotated. This is relatively time consuming which is disadvantageous, bearing in mind that the formation of the next bale cannot be commenced until the formed bale has been wrapped and discharged from the machine.

With this problem in mind, it has been proposed to wrap a round bale with a sheet of synthetic plastics material. The wrapping of a round bale with a sheet material requires appreciably less time when compared with that taken to wrap a bale with twine or ribbon-like synthetic plastics material because only one and a half to two wraps are required. However, the use of such sheet material has generated a new problem, namely that of securing the wrapping, and numerous attempts have been made to solve this difficulty. To this end, it has been proposed to replace the solid sheet synthetic plastics by netting which self-adheres to a formed bale without the need to take any special steps in this respect. Such a disclosure is made in U.S. Pat. No. 4,569,439 and in U.S. Pat. No. 4,599,844 there is disclosed a specific arrangement for severing applied netting from a source roll thereof.

While the use of netting has been found satisfactory, there is one problem associated therewith which also tends to be present in the use of solid sheeting. The problem is that of the material reducing in width as it is pulled from the source roll and thus not being utilized to full advantage in wrapping a bale.

SUMMARY OF THE INVENTION

According to the present invention there is provided a round baler comprising a bale chamber in which crop material is formed into a bale, crop material pick-up means operable to deliver crop material to the bale chamber, means for wrapping a formed bale with sheet material comprising feed means operable to feed the sheet material so that it can engage the formed bale and be wrapped therearound, means operable to sever the sheet material when the formed bale has been wrapped with a predetermined length thereof, and the improvement wherein means are disposed between the feed means and the formed bale for applying the sheet material in a predetermined width to the formed bale.

The term "sheet material" refers to not only netting but also solid sheet material or the like.

The provision of the sheet material applying means, between the sheet material feed means and the formed bale in a manner to apply the sheet material to the bale in a predetermined width, overcomes the problem of the sheet material reducing in width as a result of the sheet material being pulled from the source roll thereof.

Conveniently, the sheet material applying means are in the form of a roll having oppositely directed augering means at the respective ends which, in use, serve to spread the sheet material to, or retain it in, its full width. Some sheet materials may be such as to accommodate spreading beyond their nominal width so as to be stretched in width before being applied to a formed bale. Such sheet materials can be employed with the present invention.

The roll may be plain with each end provided with spiral flight means which may be formed from wire of generally circular cross-section.

The roll may be static, driven or free-wheeling and may be replaced by alternative means for applying the sheet material in a predeterined width to the formed bale. For example, the means may be a surved or V-shaped bar or plate.

It is preferable to locate the sheet material applying means as close as possible to the formed bale. This conveniently may be done in the path of incoming crop material from the pick-up means so that this crop material serves to take the sheet material to the bale. Thus the sheet material applying means preferably is disposed in the throat of the bale chamber through which crop matrial enters the latter but, as this throat needs to be clear so as not to present any obstruction to incoming crop during actual bale formation, the sheet material applying means may be movable between an operative position to which it lies in the bale chamber throat, and a retracted, inoperative position in which it is clear of the bale chamber throat.

The feed means for the sheet material preferably are driven initially to feed the free end of the sheet material into the vicinity of incoming crop material from the pick-up means. This drive preferably is interrupted when the sheet material has engaged the formed bale and continued rotation of the latter serves to pull the sheet material from the source roll thereof. This is preferred so that there is no conflict between the driven feed means and the pull exerted by the bale.

The severing means operable to cut the sheet material when a formed bale has been wrapped with a predetermined length thereof preferably is movable between a retracted, inoperative position and an operative position in which it crosses the path of the sheet material and thus severs the same. The severing means preferably is linked with the sheet material applying means such that, when the severing means are retracted, the sheet material applying means are in the operative position and vice versa.

DESCRIPTION OF THE DRAWINGS

A round baler constructed in accordance with the present invention will now be described in greater detail, by way of example, with reference to the accompanying drawings, in which:

FIG. 2 is an enlarged partial of the baler taken inside a side wall of the machine, FIG. 4 is a partial section on the line IV—IV of FIG. 2.

DESCRIPTION OF THE PREFERRED EMBODIMENT

Figure 1:
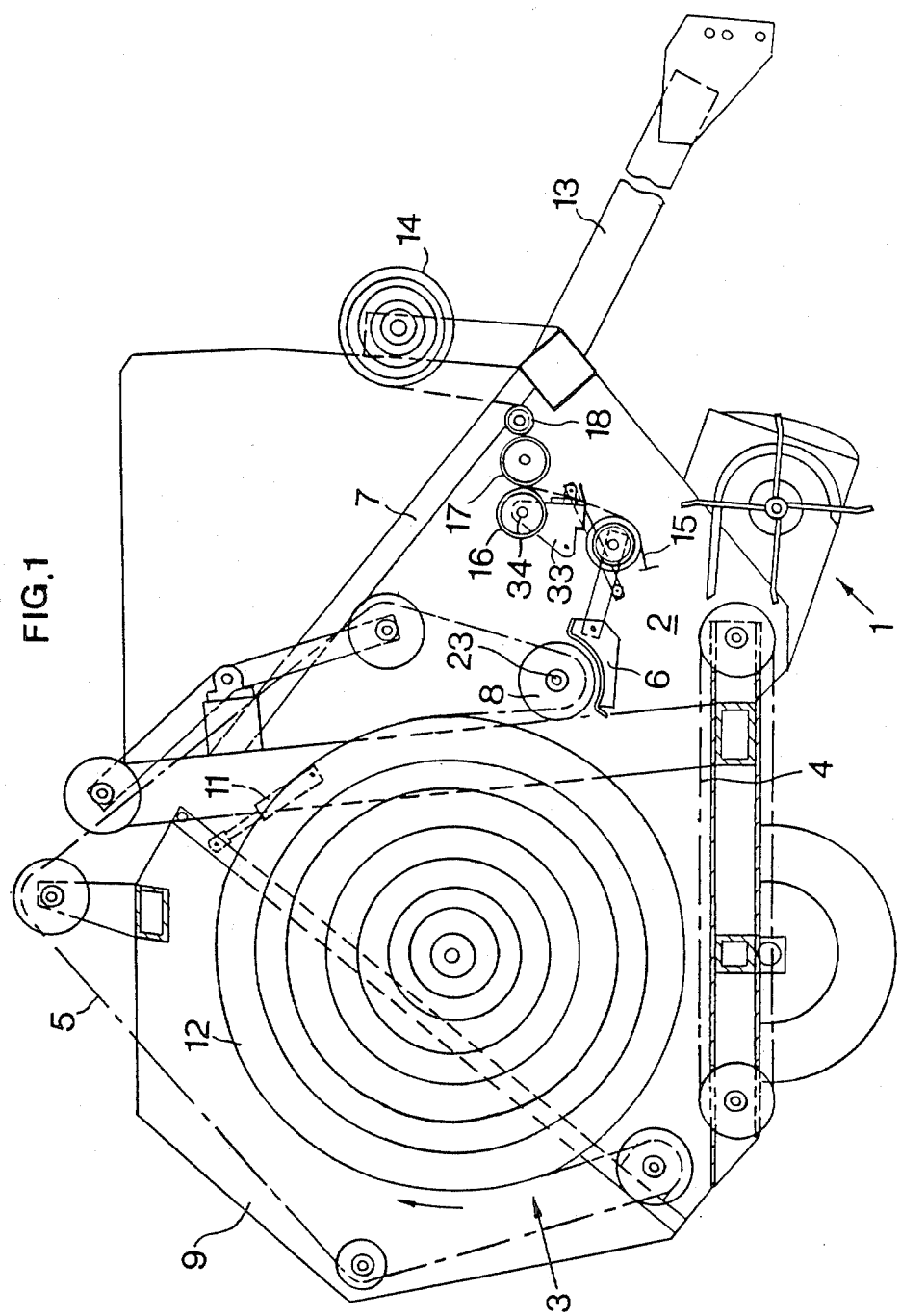
FIG. 1 is a diagrammatic side view of the baler, partly in section.

Referring first to FIG. 1, the baler is basically of conventional design and is generally similar, for example, to that disclosed in U.S. Pat. No. 4,366,665. Briefly, the baler comprises crop material pick-up means 1 operable to pick up crop material from the ground and deliver it to a throat 2 of a bale chamber 3 formed by a floor conveyor or lower apron 4 and an expandable upper apron 5. The bottom and top of the throat 2 are defined by the floor conveyor 4 and the drive sprockets 8 for the upper apron 5, respectively. The bale chamber 3 is split into two with one portion being in the form of a tailgate 9 which can be raised by hydraulic cylinders 11 in order that a completed bale 12 can be discharged from the machine. A tongue 13 is attached to the frame 7 for connection to a tractor or other vehicle used to tow the baler.

The baler further comprises a source of sheet material for wrapping a completed bale in the form of a roll 14 of a net of a nominal width and rotatably mounted on the frame 7. Feed means are provided for feeding the sheet material 15 from the roll 14, the feed means comprising a driven roll 16, a similarly-sized freely rotatable pinch roll 17, and a small pinch roll 18. The sheet material is fed from the source roll 14 under the feed roll 18, over the feed roll 17, and down between the feed rolls 16 and 17. The feed rolls 16,17 and 18 are shown in greater detail in FIG. 2 and reference will now be made to this figure, as well as FIGS. 3 and 4.

The driven feed roll 16 carries a pulley 19 and is driven via a belt 22, from a pulley 21 attached to a shaft 23 of the drive sprockets 8 of the upper apron 5. Drive is imparted to the feed roll 16 when the belt 22 is tensioned by a tension pulley 24 rotatably mounted on the end of one arm 25 of a bell-crank lever 26 pivoted at 27 on the adjacent side wall of the machine. The other arm 28 of the bell-crank lever 26 is pivotally attached to an actuating member 29 of a linear actuator 31 also mounted on the side wall of the machine.

Severing means in the form of a knife 32 is mounted on a support 33 pivoted about the axis 34 of the feed roll 16. The support 33 has a pin 36 which extends through the associated side wall of the baler to receive one end of a double or S-shaped hook 37, the other end of which engages a pin 38 on the end of the armature 39 of a solenoid 41 mounted on a bracket 42 attached to the baler side wall. A compression spring 43 extends between the pin 36 on the support 33 and an aperture in a bracket 44 also mounted on the baler side wall.

The support 33 has a mounting bracket 45 extending therefrom and to which is pivotally attached one end of an arm 46, the other end of which is pivotally attached to a bracket 47 carried by a further arm 48 intermediate the ends thereof. One end of the arm 48 is pivotally attached to the member 6 attached to the frame 7 and shielding the upper apron drive sprocket 8 proximate thereto. The distil end of the arm 8 carries one end of sheet material applying means in the form of a freely rotatable roll 49. The other end of the roll 49 is rotatably carried by a swing link (not shown) similar to the arm 8.

As shown in FIG. 4, the roll 49 is plain except that, at each end, it is provided with oppositely and outwardly directed auger flights 51 in the form of circular cross-section wire wound around the roll.

In use of the baler, crop material is picked up by the pick-up 1 and fed to the bale chamber 3 through the throat 2 and is rolled into a cylindrical bale between the lower and upper aprons 4 and 5 in a conventional manner. When the bale has reached either the maximum size for the machine or a size required by the operator, it is wrapped with the sheet material in the form of the netting 15, in the following manner.

Figure 3:
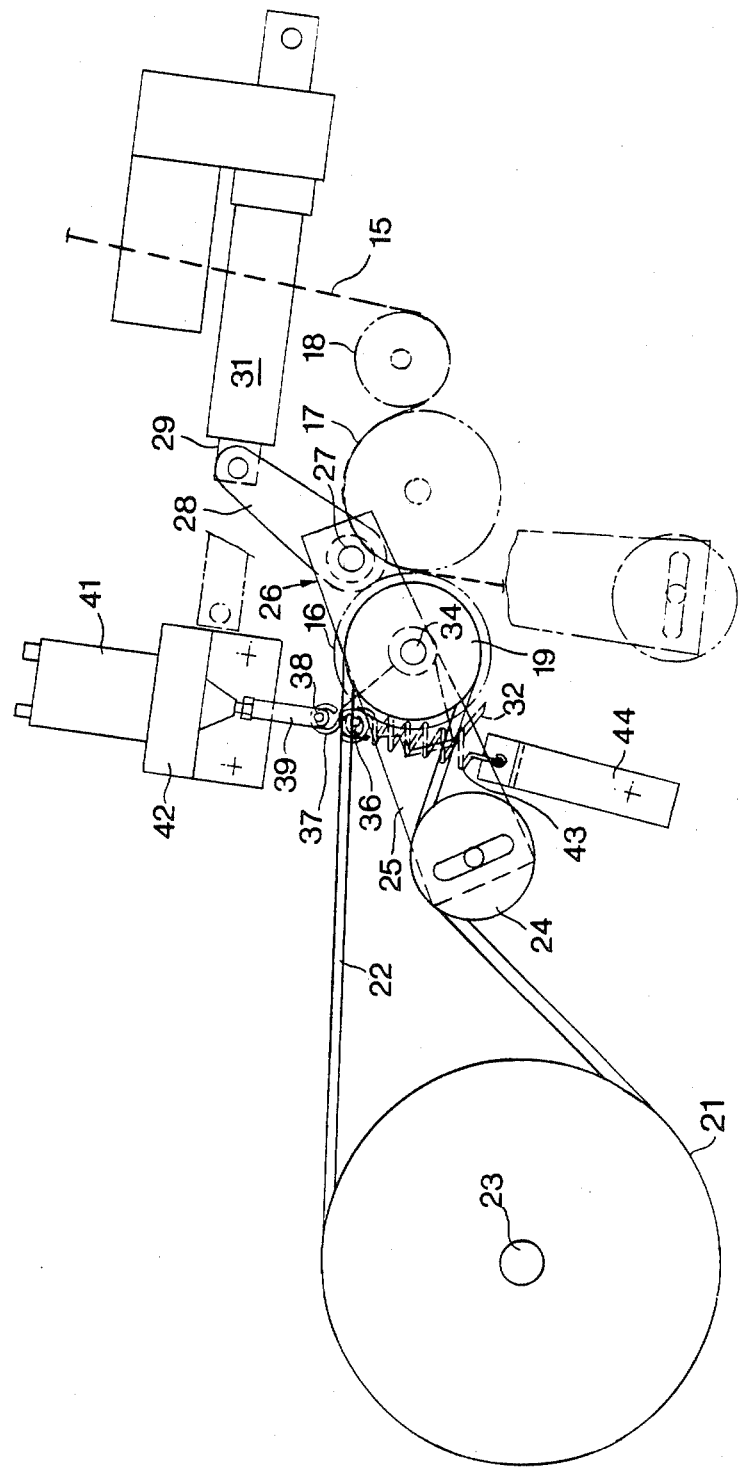
FIG. 3 is an enlarged partial side view of the baler.

The linear actuator 31 is energized to retract the actuating member 29 thereof from the extended position shown in broken lines in FIG. 3 to the fully retracted position shown in full lines in FIG. 3. This movement of the actuating member 29 rocks the bell-crank lever 26 about its pivot 27 in a clockwise direction as seen in FIG. 3, whereby the tension pulley 24 is raised and engages and tensions the belt 22 so that drive is imparted to the feed roll 16. On rotation of the feed roll 16, the pinch feed rolls 17 and 18 are also rotated through friction and the sheet material 15 is fed from the source roll 14 and the free end thereof thus is lowered towards the pick-up 1. At this point, the pick-up 1 is still operative and is thus feeding further crop material into the throat 2 and this crop material contacts the lowered sheet material 15 and therefore carries the latter into the throat 2 to the formed bale 12. As soon as this occurs, the forward movement of the baler is stopped as it is undesirable to feed further crop material to the bale when the latter is being wrapped. As the sheet material 15 passes beneath the completed bale 12 which is being rotated within the bale chamber 3, the bale 12 then pulls the sheet material 15 and, in order to avoid any conflict between this pulling action and the feeding effected by the feed rolls 16,17 and 18, the drive to the feed roll 16 is interrupted so that the feeding of the sheet material 15 is taken over solely by the rotating bale 12.

At this point, it should be mentioned that either simultaneously with the energization of the linear actuator 31, the solenoid 41 is energized which retracts the armature 39 thereof and thus swings the support 33 clockwise as seen in FIG. 2, thereby raising the pin 36 against the action of the spring 43. Thus, the knife 32 is swung out of the path of the sheet material 15 to the retracted position shown in broken lines in FIG. 2. This rotational movement of the support 33 moves the arm 46 from the full line position to the broken line position of FIG. 2 in which the material applying roll 49 occupies the broken line position which is its operative position in which it is located in the throat 2.

The obstruction which the roll 49 presents in the throat is immaterial in as much as, at this stage, the feeding of further crop material into the bale chamber 3 soon is to be terminated as already explained. Therefore, the roll 49 does not form an unacceptable obstruction to the last bit of incoming crop material. The sheet material 15 then being pulled from the source roll 14, engages the roll 49 and the oppositely directed flights 51 thereon, in effect, auger the opposed edges of the sheet material outwardly in order that the sheet is maintained substantially in its full nominal width, thus counteracting the natural tendency of the width to reduce in width on being pulled from the source roll 14. Accordingly, the sheet material 15 is applied to the completed bale in a predetermined width so that maximum use is made of the sheet material in order to wrap the bale. It may be necessary to provide some guide means or stop means 50 at one or both sides of the roll 49 to ensure that the sheet material, in being maintained in its full nominal width on being applied to the completed bale 12, does not foul any components of the baler (i.e., is not spread too widely).

Returning to the de-energization of the linear actuator 31, this is effected, as already stated, in order to allow the sheet material 15 to be pulled freely from the source roll 14 by the rotating bale 12. However, at the time de-energization of the linear actuator 31 is effected, the solenoid 41 remains energized. However, a timer (not shown) is energized in order to effect de-energization of the solenoid 41 at a predetermined time after the de-energization of the linear actuator 31. When the timer operates to effect this de-energization of the solenoid 41, the knife 32 is released and thus rotates swiftly anti-clockwise under the action of the apron 43, as well as of gravity, to contact and thus sever the sheet material 15. On severing of the sheet material 15, the bale 12 continues to be rotated so that the thus freed end of the sheet material being wrapped around the bale is taken up and the wrapping of the bale is completed.

Upon completion of wrapping, the baler tailgate 9 is raised and the wrapped bale is discharged to the ground. The form of the sheet material used in the illustrated embodiment, namely that of netting, is self-adhering so that no special means have to be taken to secure the cut end of the netting. This self-adhesion is effected by the crop material engaging and extending through the netting to a certain extend which, in effect, holds the netting thereon.

As the knife 32 moves to the operative position to sever the sheet material 15, the consequential rotational movement of the associated support 33 moves the arm 48 back to the full line position of FIG. 2 and thus, the material applying roll 49 is retracted to the inoperative position in which it is located clear of the throat 2 of the baler and thus does not obstruct crop entering the bale chamber 3 from the pick-up 1 when the baler is moved forward again in order to pick up further crop material and to commence formation of the next bale.

The provision of the sheet applying roll 49 in accordance with the present invention ensures satisfactory wrapping of a bale on each occasion in that the nominal width of the sheet material 15 is maintained and thus used to full advantage in wrapping a bale. This represents an important advance in the art because repeatability in wrapping quality is maintained and time is not lost in checking whether a bale has been wrapped correctly using the full width of the sheet material and if not, re-wrapping the bale before discharging it from the baler. Accordingly, the productivity of a baler incorporating the present invention is increased.

The form of the roll 49 can be varied. For example, the roll could be driven or held stationary rather than being freely rotatable as in the illustrated embodiment. Furthermore, the roll 49 could be replaced by a fixed member such as a bar or plate so shaped so as to effect the desired spreading of the sheet material 15 in order to maintain at least its nominal width. If the sheet material being used is capable of being stretched beyond its nominal width, then the material applying means can be desired so as to effect stretching of the material to a predetermined width and applying the material at that width to a formed bale.

It should be noted that the feed means for the sheet material 15 may be of any form and, for example, the third roll 18 in the illustrated embodiment may either be dispensed with or separated from the roll 17 so as not to provide a pinch roller action therewith.

It also should be noted that the feed means 16,17,18 and the sheet material applying means 49 may be provided at another position relative to the bale chamber 3, i.e., the feed rolls 16,17,18 and the applying roll 49 do not necessarily have to be associated with the pick-up 1 and the bale chamber throat 2. Instead said components e.g. may be provided generally at the top of the baler to feed the sheet material 15 into the bale chamber 3 through the gap inbetween a pair of bale forming members in case these bale forming members are in the form of rolls such as the rolls 50f, 40j shown in U.S. Pat. No. 4,566,379.

Having thus described the invention, what is claimed is:

1. A round baler comprising a bale chamber in which crop material is formed into a bale, crop material pick-up means operable to deliver crop material to the bale chamber, means for wrapping a formed bale with sheet materal comprising feed means operable to feed the sheet material so that is can engage the formed bale and be wrapped therearound, and severing means operable to sever the sheet material when the formed bale has been wrapped with a predetermined length thereof, the improvement comprising material applying means disposed between the feed means and the formed bale for applying the sheet material in a predetermined width to the formed bale, the material applying means being mounted for movement between an operative position in which it is located in a throat of the bale chamber through which crop material is fed by the pick-up means and a retracted, inoperative position in which it is disposed clear of the throat.

2. A baler according to claim 1, wherein the material applying means comprises a roll provided with oppositely directed augering means at its respective ends.

3. A baler according to claim 2, wherein the augering means are in the form of flights wound on the respective ends of the roll.

4. A baler according to claim 3, wherein the flights are formed from wire of generally circular cross-section.

5. A baler according to claim 2, wherein the roll is freely rotatable.

6. A baler according to claim 1, wherein the material applying means are in the form of a shaped member with oppositely directed sheet material directing means at its respective ends.

7. A baler according to claim 1, wherein the material applying means comprises stop means at the opposite ends thereof for preventing spreading of the sheet material beyond a predetermined width.

8. A baler according to claim 1, wherein the severing means is in the form of a knife movable between an operative position in which it crosses the path of the sheet material to cut the same and a retracted, inoperative position; the severing means and the material applying means being interrelated such that when the severing means is retracted, the material applying means is in the operative position and vice versa.

9. A baler according to claim 1, wherein, the feed means comprises a plurality of feed rolls which are driven by a drive means to effect initial feeding of the sheet material for wrapping a completed bale and then disengaged from the drive means so as to allow free rotation when the sheet material has engaged the formed bale and is pulled by the formed bale.

* * * * *